Patented Feb. 4, 1947

2,415,096

UNITED STATES PATENT OFFICE 2,415,096

OXYGEN TREATED ORGANIC PRODUCTS AND METHODS FOR PRODUCING THEM

Mortimer T. Harvey, South Orange, N. J., assignor to Harvel Research Corporation, a corporation of New Jersey No Drawing. Application April 26, 1944, Serial No. 532,884

14 Claims. (Cl. 260—606)

This invention relates to novel products and to methods for preparing the same. In one of its specific aspects this invention is directed to novel products capable of producing gels with certain compounds and to the methods for producing said products. In another aspect this invention relates to gels and millable and cured compositions and to the methods for producing said gels and millable and cured compositions. This application is a continuation in part of my copending application Serial No. 405,074, filed August 1, 1941.

I have produced gels which comprised a normally solid vinyl resin and a normally liquid unsaturated organic material. Some of said resins employed were the polymers of vinyl chloride, vinyl acetate, vinyl chloracetate and vinyl acetals such as vinyl butyral, etc., and the copolymers of vinyl chloride and vinyl acetate. Some of the normally liquid unsaturated organic materials employed were alkyl esters of abietic acid and particularly those having from one to four carbon atoms in the alkyl group, examples of which are methyl abietate, ethyl abietate, etc., the liquid condensation reaction products of a terpene, examples of which are turpentine, pinene, dipentine, limonine, cedar wood oil, cedrene, etc. with formaldehyde in the presence of an acidic condensing agent (examples of some of said terpene-formaldehyde liquid reaction products are disclosed in my Patent 2,350,230 issued May 30, 1944) the liquid condensation reaction products of a terpene alcohol, examples of which are pine oil, terpineol, eucalyptol, etc., with formaldehyde in the presence of an acidic condensing agent (examples of some of said terpene alcohol-formaldehyde reaction products are disclosed in my Patent 2,362,538 issued November 14, 1944) and the normally liquid condensation reaction products of tertiary alkyl alcohols, examples of which are, tertiary amyl alcohol, tertiary butyl alcohol, tertiary hexyl alcohol, tertiary heptyl alcohol, tertiary octyl alcohol, etc., with formaldehyde in the presence of an acidic condensing agent.

According to the present invention, novel products are obtained by oxidizing that class of normally liquid unsaturated organic substances which are capable of forming a gel with said normally solid polymers and copolymers of the vinyl compounds heretofore set forth. These novel oxidized products are characterized by a greater viscosity and greater percentage of combined oxygen content when compared with the corresponding characteristics of said unsaturated organic substances in their unoxidized condition. Said substances of said class may be oxidized to increase the percentage of combined oxygen therein and to increase their viscosities by subjecting the same to an oxidizing agent capable of so modifying said substances. Among some of the agents which may be used for this purpose are oxygen, air, ozone, and the like.

The invention is particularly directed to the treatment of that class of normally liquid unsaturated organic products which when in the ratio of 5 parts of any one of said products to one part of normally solid polyvinyl chloride can be heated to an elevated temperature of about 250° F. to 350° F. to form a solution which upon cooling is a gel at 70° F. The invention also is directed to the resultant products produced by following the methods of this invention, which resultant products which when in the ratio of five parts of any one of said products to one part of normally solid polyvinyl chloride can be heated to an elevated temperature of about 250° F. to 350° F. to form a solution which upon cooling is a gel at 70° F.

One of the commercially practical methods which may be employed in oxidizing said substances of said class is to blow the same with oxygen, ozone or air. Briefly stated, the novel method comprises heating above about 140° F. a mass of a normally liquid unsaturated organic product capable at elevated temperatures of forming a solution with solid polyvinyl chloride which solution on cooling is a gel at 70° F. and while said mass is in said heated condition agitating said mass in the presence of a gas containing free oxygen until the viscosity of said mass at 25° C. has increased at least 0.5%. Although temperatures greatly in excess of 140° F. may be employed, I prefer to employ a temperature range of between about 140° F. to 400° F. notwithstanding that temperatures in excess of 400° F. and as high as 600° F. may be employed. While a wide variety of gas containing free oxygen may be employed, for the purposes of illustration, I disclose the use of air, oxygen or ozone, the former being the most preferable because of its availability and low cost. The agitation of said normally liquid unsaturated organic product may be accomplished by flowing the material, by projecting the material, or by forcing the gas itself through the material being treated.

One of the specific methods for producing these novel products which method is particularly applicable commercially is to blow said normally liquid unsaturated organic product at temperatures above 140° F. with a gas containing free oxygen. The blowing may be carried out by forcing said gas through the heated product being treated, by allowing the product being treated to trickle over inclined surfaces in the presence of said gas, or by forcing the product being treated through an "atomizing" nozzle to break the same into small particles which are projected into a chamber containing said gas. Any one of said specific methods may be employed alone or a combination of two or more of them may be used. This invention may be practiced at atmospheric pressure or super atmospheric pressures. These specific methods are set forth merely for the purposes of illustration and show that variations of these particular methods may be used to obtain agitation and therefore a high degree of surface contact of the product being treated to said gas so that the time of treatment may be such as to make the process commercially practicable. While the time of treatment is variable, depending on the temperature of the product being treated and the degree of surface contact of this product and said gas per unit of time, I prefer that the product being treated be maintained above 140° F. and a contact with the free oxygen containing gas until the viscosity at 25° C. of the resultant product be at least 50% greater than the viscosity at 25° C. of the untreated product and that its percentage of combined oxygen be at least 0.5% greater than the percentage of combined oxygen of the untreated product. In most cases, however, I prefer that this treatment be continued until the resultant product has a viscosity which is at least 100% greater than that of the untreated product and its combined oxygen content be at least 100% greater than that of the untreated product.

The alkyl esters of abietic acid and preferably the alkyl esters of abietic acid having from one to four carbon atoms in the alkyl group represent one genus of a normally liquid unsaturated organic material which is capable at elevated temperatures of forming a solution with solid polymers of vinyl chloride, vinyl acetate, vinyl chloracetate, and the vinyl acetals, such as vinyl butyral, etc., and copolymers of vinyl chloride and vinyl acetate which solution upon cooling is a gel at 70° F. A wide variety of gels may be produced by varying the ratio of the quantity of the ester employed to the quantity of the polymer or copolymer employed. For the purposes of illustration, the following is a specific example of the method for producing a gel which is a rubbery mass.

Example 1.—One hundred parts by weight of methyl abietate, hereinafter referred to as product L, are heated to between 150° C. and 165° C and twenty-five parts of solid polymerized vinyl chloride, known to the trade as "vinylite QYNA," having a molecular weight of about 20,000 to 22,000, are added to said methyl abietate at said temperature and the mass is stirred until solution takes place at said temperature. The solution is allowed to cool to room temperature and at this temperature of about 70° F. this mass is a gel which may be further characterized as rubbery and resilient. The methyl abietate employed is obtainable on the market as "Abalyn" and has a specific gravity at 25° C. of 1.025 and a viscosity at 25° C. of 3200 centipoises. Although methyl abietate has been employed in this example the other alkyl esters of abietic acid and particularly those having from one to four carbon atoms in the alkyl group may be substituted for the methyl abietate and may be of the same quantity by weight to obtain the same type solid rubbery gel.

A second genus of a normally liquid unsaturated organic material capable at elevated temperatures of forming a solution with a solid resin selected from the group consisting of polymers of vinyl chloride, vinyl acetate, vinyl chloracetate, and the vinyl acetals such as vinyl butyral, etc., and copolymers of vinyl chloride and vinyl acetate are the liquid organic condensation reaction products produced by reacting a terpene with formaldehyde in the presence of an acidic catalyst.

A commercially practical method for producing this second genus is to react a terpene and formaldehyde in aqueous solution in the presence of an amount of an acid so limited in quantity that the pH of the aqueous phase of the mix is less than that required to cause material polymerization of the terpene. In carrying out this process, between 1 to 7 molecular proportions and preferably between 3 to 7 molecular proportions of formaldehyde are used for each molecular proportion of the terpene. The commercially available aqueous solution of formaldehyde containing approximately 37.5–40% formaldehyde is employed. The quantity of acid is preferably very low and for most purposes may be between .01 and 0.1 mole per mole of terpene.

The following Examples 2–7 inclusive, illustrate the specific manner of preparing some of said reaction products of this genus and are given for the purposes of illustration.

Example 2.—About 150 pounds of a commercial water solution of formaldehyde (about 37.5% formaldehyde in water), about 100 pounds of gum turpentine (U. S. Naval Stores) and about 250 cc. of concentrated sulphuric acid were placed together and agitated, the formaldehyde solution and the sulphuric acid being brought carefully together before the turpentine was added. This mixture of turpentine, formaldehyde solution and sulphuric acid were heated to boiling and maintained in the state of boiling under a reflux condenser while being constantly agitated for about nine hours. At the end of this nine hour period about 2.25 pounds of dry caustic soda was added to the resulting mix and agitated therein for about an hour in order to neutralize the sulphuric acid present. The mixture was allowed to stand for about 8 hours after which it was found to have separated into two main layers, (a) an oily or oil-like layer and (b) a watery layer. The oily or oil-like layer was separated from the water layer and placed in pans in an over at about 275° F. to vaporize and remove any remaining water and until a practically clear solution of the condensation reaction product was obtained in a solvent such as ethyl alcohol. This oily or oil-like product thus finally obtained is hereinafter designated as product A, at 27° C. has a specific gravity of 1.08 and at 25° C. has a viscosity of 6156 centipoises.

Example 3.—About 40 pounds of 37.5% formaldehyde in water solution, about 57 pounds of pinene and about 120 cc. of concentrated sulphuric acid were mixed together, the formaldehyde solution and sulphuric acid having been carefully brought together before the turpentine was added. This mixture of aqueous formaldehyde solution, turpentine and sulphuric acid was heated to boiling and maintained in this state of boiling under a reflux condenser while being constantly agitated for about nine hours. At the end of this nine hour period about .2 of a pound of dry caustic soda was added thereto and agitated therethrough to neutralize the sulphuric acid. The mixture was allowed to stand for about 8 hours after which it was found to have separated into two main layers, (a) an oily or oil-like layer and (b) a watery layer. The oily or oil-like layer was separated from the water layer and placed in pans in an oven at 275° F. to remove any remaining water and until a practically clear solution of the same may be obtained in a solvent such as ethyl alcohol. This oily or oil-like product thus finally obtained is hereinafter designed as product B.

Example 4.—About 900 grams of aqueous solution of formaldehyde (37.5% formaldehyde in water), were mixed with about 4 cc. of concentrated sulphuric acid. Then to said mixture was added about 544 grams of dipentene. This mixture of formaldehyde solution, sulphuric acid and dipentene was heated to boiling and maintained in this state of boiling under a reflux condenser and while being constantly agitated for about six hours. At the end of this six hour period, about 4.3 grams of dry caustic soda was added to the resulting mix and this mixture was heated to boiling for about one more hour and then allowed to cool to about room temperature whereupon the mixture was two separate layers, (a) an oily or oil-like layer and (b) a watery layer. The oily or oil-like layer was separated from the watery layer and dehydrated as set forth in Examples 2 and 3. The resultant oily or oil-like layer of this example is hereinafter designated as product C, at 32° C. has a specific gravity of 0.971 and at 25° C. has a viscosity of 19 centipoises.

Example 5.—About 675 grams of an aqueous solution of formaldehyde containing 37.5% formaldehyde and 3.5 cc. of concentrated sulphuric acid were mixed together and 560 grams of cedar wood oil added thereto. This mixture of formaldehyde solution, sulphuric acid and cedar wood oil was heated to boiling and maintained in this state of boiling under a reflux condenser while being continuously agitated for a period of about 9 hours. Thereafter, 3.6 grams of dry caustic soda were added thereto and admixed therewith to neutralize the sulphuric acid. The mixture was allowed to stand after which it was separated into two main layers (a) an oily or oil-like layer and (b) a watery layer. The oily or oil-like layer was separated from the watery layer and placed in pans in an oven at 275° F. to remove any remaining water. This oil-like product thus finally obtained is hereinafter designated as product D, and has at 25° C. a specific gravity of 0.972 and a viscosity of 43.7.

Instead of employing an aqueous solution of formaldehyde in the preparation of the reaction condensation products of terpenes and formaldehyde, the reaction may be carried out with substantially anhydrous reactants, and even in this instance the quantity of mineral acid catalyst employed is less than that required to cause appreciable polymerization of the terpenes. The following illustrates the manner of preparing some of the reaction products of said second genus under said conditions:

Example 6.—A mixture of 462 parts of turpentine, 90 parts of paraformaldehyde, 30 parts of glacial acetic acid and 3.3 parts of concentrated sulphuric acid is heated to boiling and maintained in this state of boiling while being constantly agitated for about eight hours under a reflux condenser. The resultant mass is neutralized by adding and admixing therewith caustic soda after which salts precipitate out and may be removed by decantation. The liquid may then be distilled to distill off the water, acetic acid, as well as any unreacted formaldehyde and turpentine. The remaining liquid is the organic condensation reaction product, will hereinafter be designated as product E and has at 25° C. a specific gravity of 1.09 and a viscosity of 5300 centipoises.

Example 7.—A mixture of 350 parts of pinene, 90 parts of paraformaldehyde, 30 parts of glacial acetic acid and 3.3 parts of concentrated sulphuric acid is heated to boiling and maintained in this state while being constantly agitated for about 8 hours under a reflux condenser. The resultant mass is then neutralized by admixing therewith caustic soda after which salts precipitate out and are removed therefrom. The liquid may then be distilled to drive off the water, acetic acid, as well as any unreacted pinene and formaldehyde. The remaining liquid is the organic condensation reaction product, will hereinafter be designated as product F. and has at 25° C. a specific gravity of 1.08 and a viscosity of 570 centipoises.

A third genus of a normally liquid unsaturated organic material capable at elevated temperatures of forming a solution with a solid resin selected from the group consisting of polymers and copolymers of vinyl chloride, vinyl acetate, vinyl chloracetate and the vinyl acetals, such as vinyl butyral, etc., are the liquid organic condensation reaction products produced by reacting a terpene alcohol with formaldehyde in the presence of an acidic catalyst.

A commercially practical method for producing this third genus is to react a terpene alcohol and formaldehyde in aqueous solution in the presence of an amount of an acid so limited in quantity that the pH of the aqueous phase of the mix is less than that required to cause appreciable polymerization of the terpene alcohol. In carrying out this process between 1 and 7 molecular proportions and preferably between 2 and 7 molecular proportions of formaldehyde are used for each molecular proportion of the terpene alcohol. Commercially available aqueous solution of formaldehyde containing 37.5 to 40% formaldehyde is employed. The quantity of acid is preferably very low and for most purposes the mole ratio of the formaldehyde to the acid catalyst in said mixture may be between about 3 to .01 and 1. to .1.

The following examples 8–10 illustrate the specific manner of preparing some of the reaction products of this genus and are given for the purposes of illustration:

Example 8.—About 612 grams of an aqueous solution of formaldehyde containing 37.5% formaldehyde and 3.1 cc. of concentrated sulphuric acid were mixed together and 375 grams of pine oil were added thereto. This mixture of pine oil, sulphuric acid and aqueous formaldehyde was heated to boiling and maintained in this state of boiling under constant agitation and under a reflux condenser for about six hours. Then about 4.3 grams of dry caustic soda was added thereto and admixed therewith to neutralize the sulphuric acid. At room temperature, the mix separated into two main layers, (a) an oily or oil-like layer and (b) a water layer. The oily or oil-like layer was dehydrated by heating as in Examples 2 and 3 to provide reaction condensation product hereinafter designated as product G and having at 25° C. a specific gravity of 1.065 and a viscosity of 1649 centipoises.

*Example 9.*—About 1000 grams of 37.5% formaldehyde in water solution and 4.5 cc. of concentrated sulphuric acid were mixed together and 616 grams of oil of eucalyptus (product of Guatemala) were added to said mixture. This mixture of formaldehyde solution, sulphuric acid, and oil of eucalyptus was heated to boiling and maintained in this state of boiling under a reflux condenser while being constantly agitated for about 9 hours. Then about 4.8 grams of dry caustic soda were added thereto and mixed therewith in order to neutralize the sulphuric acid. The mix was allowed to stand and separated into two main layers, (a) an oily or oil-like layer and (b) an aqueous layer. The oil-like layer was separated from the watery layer and heated as in Examples 2 and 3 to remove any water therefrom. This condensation reaction product is hereinafter designated as product H and has at 25° C. a specific gravity of 1.005 and a viscosity of 190 centipoises.

Instead of employing an aqueous solution of formaldehyde in the preparation of the reaction condensation products of terpene alcohols and formaldehyde, the reaction may be carried out with substantially anhydrous reactants, and even in this instance the quantity of mineral catalyst employed is less than that required to cause appreciable polymerization of the terpene alcohols.

The following illustrates the manner of preparing some of the reaction products of said second genus under said conditions:

*Example 10.*—A mixture of 150 parts of pine oil, 90 parts of paraformaldehyde, 30 parts of glacial acetic acid and 3.3 parts of concentrated sulphuric acid is heated to boiling while being constantly agitated for about eight hours under a reflux condenser. The resultant mass is neutralized with caustic soda after which precipitated salts are removed therefrom. The liquid may be distilled to remove water, acetic acid as well as any unreacted formaldehyde and turpentine. The remaining liquid is the organic condensation reaction product hereinafter designated as product I and having at 25° C. a specific gravity of 1.09 and a viscosity of 356 centipoises.

Still another genus of a normally liquid unsaturated organic material capable at elevated temperatures of forming a solution with a solid resin selected from the group consisting of polymers of vinyl chloride, vinyl acetate, vinyl chloracetate, and the vinyl acetals, such as vinyl butyral, etc., and copolymers of vinyl chloride and vinyl acetate are the liquid organic condensation reaction products produced by reacting one of said tertiary alkyl alcohols with formaldehyde in the presence of an acidic catalyst.

A commercially practical method for producing this last described genus is to react a tertiary alcohol and formaldehyde in the presence of an acidic catalyst. In carrying out this process, between 1 to 8 molecular proportions and preferably between 3 to 8 molecular proportions of formaldehyde are used for each molecular proportion of the tertiary alkyl alcohol. The commercially available aqueous solution of formaldehyde containing approximately 37.5–40% formaldehyde is employed. The quantity of acid is preferably very low and is preferably between about .01 mole to .1 mole per mole of tertiary alkyl alcohol.

The following Examples 11–13 inclusive illustrate the specific manner of preparing some of the reaction products of this genus and are given for the purposes of illustration.

*Example 11.*—About 306 grams of tertiary hexyl alcohol, which in this example is diethyl methyl carbinol with a boiling point of 123° C. was mixed with 720 grams of aqueous formaldehyde solution (37.5%) and 1.5 cc. of sulphuric acid concentrated. This mixture was heated in an autoclave to 100 pounds per square inch pressure and held there for about one hour. The mixture was cooled to room temperature and no odor of formaldehyde remained. It was then neutralized with dilute sodium hydroxide and separated into two layers, an oily layer and a watery layer. The oily layer which separated out had a specific gravity of about 0.992. The oily layer was distilled at a temperature above 135° C. to remove water and any volatile constituents. The liquid residue was soluble in alcohol and benzene but insoluble in water and distilled at atmospheric pressure as follows:

| Per cent distilled | 10 | 20 | 30 | 40 | 50 | 60 | 70 | 80 | 90 |
|---|---|---|---|---|---|---|---|---|---|
| °C | 175 | 194 | 210 | 225 | 242 | 253 | 263 | 280 | 300 |

*Example 12.*—About 225 grams of a 40% aqueous solution of formaldehyde was mixed with about 74 grams of tertiary butyl alcohol and 10 grams of hydrochloric acid. This mixture was heated to boiling and maintained in this state of boiling under a reflux condenser for about six hours. After neutralizing the reaction mixture with dilute sodium hydroxide, an upper oily layer was separated from the water layer and distilled to volatilize any liquids boiling below 135° C. Fractions of this product hereinafter designated as product J had boiling points above 135° C. and as high as 280° C. and specific gravities greater than 1.

*Example 13.*—About 720 grams of aqueous formaldehyde solution, 37.5% formaldehyde, is mixed with 264 grams of tertiary amyl alcohol and 1.3 cc. of concentrated sulphuric acid. The mixture was placed in an autoclave and heated until the gauge indicated a pressure of 100 pounds per square inch. The pressure tended to rise rapidly at this point indicating an exothermic action. Application of heat was stopped until reaction subsided and pressure commenced to drop. Heat was then reapplied and so regulated as to maintain the pressure at 100 lbs. per sq. in. for one hour. The mixture was cooled and when the autoclave was opened, it was found that the odor of formaldehyde had disappeared. The contents had separated into two layers. Dilute sodium hydroxide was added until the aqueous layer was neutral and then the oily layer was separated therefrom. The oily layer was then distilled by heating to a temperature of about 135° C. to distill off water and other volatile products which may have been contained therein. The residual oil which weighed about 370 grams had a specific gravity at 25° C. of 1.075 and a viscosity of 130 centipoises at 25° C. and is hereinafter designated as product K.

Throughout this description and claims, the term "formaldehyde" is employed to include formaldehyde as well as paraformaldehyde which is formaldehyde in the polymerized state.

Each of the unsaturated organic substances, of which products A–L inclusive are examples, capable of dissolving the aforementioned solid polymers and copolymers and capable of forming a gel therewith, are oxidized by treating the same with air, oxygen, ozone or the like to provide a resultant product having a greater viscosity and a higher oxygen content. The method preferably employed for this purpose is to blow said substances with air, oxygen, ozone or the like. The blowing may be accomplished by forcing said air, oxygen, ozone or the like through a quantity of said substance in a tank, or by spraying or flowing said substances into or through an ambient of ozone, air or oxygen. In carrying out this operation, it is preferable that the substance being blown be maintained between about 160° F. to about 200° F. and the temperature of the air, oxygen or ozone be at least as high as room temperature although it may also be at the elevated temperature employed.

The following is an illustrative general example for increasing the viscosity and combined oxygen content of said unsaturated organic liquids capable of dissolving said vinyl resins and forming a gel therewith.

*Example 14.*—A quantity of one of said unsaturated organic liquids, such as any one of the specific products A–L, is placed into a closed container having a conduit extending through the top thereof and terminating at a point spaced from but near the bottom thereof. The lower end of said conduit has a plurality of lateral openings therethrough, through which air, oxygen or ozone may be discharged and into said unsaturated organic liquid at places below the upper surfaces of said liquid. The container has a vent located near the top thereof to release air, used to prevent too great pressure being built up in said container and to allow the air, oxygen or ozone to circulate through said liquid. A stirrer is employed to constantly agitate said liquid throughout the entire operation thereby to increase the contact of the liquid with the air, oxygen or ozone. Throughout the entire operation, the liquid is maintained at a temperature between about 160° F. and 300° F., while the air, oxygen or ozone, admitted to said container may be at room temperature. The quantity of liquid in the container may be about one-quarter of the capacity thereof in order to accommodate the great deal of splashing due to the bubbling of the air, oxygen or ozone therethrough and the agitation due to stirring. After a period of between about 24 to 144 hours, depending upon the rate of stirring, the rate of air, oxygen or ozone admission and the quantity of said liquid, said liquid will be found to have increased in specific gravity, viscosity and combined oxygen content when compared with the respective corresponding characteristics before said operation was begun. The combined oxygen content will have increased at least 1% and in some cases will have increased as high as about 19% or more. The viscosity at 25° C. will have increased at least 100% and in some cases will have increased to such a degree that it has been converted to a mass which is semi-solid at 25° C.

*Example 15.*—After products A, D, G and H were heated to a temperature of about 90° C. and air blown for a period of 24 hours while being maintained at said elevated temperature, the resulting respective products, hereinafter designated AO, DO, GO and HO had the following specific gravities and viscosities:

| Products | Specific gravity at ° C. | Viscosity in centipoises at 25° C. |
| --- | --- | --- |
| AO | 1.109/29 | 20,650. |
| DO | 1.077/27 | Semi-solid. |
| GO | 1.075/25 | 4,458. |
| HO | 1.045/26 | 190. |

*Example 16.*—After product C was heated to a temperature of about 90° C. and air blown for a period of 72 hours while being maintained at said elevated temperature, the resulting product hereinafter designated as CO had at 25° C. a specific gravity of 0.988 and at 25° C. a viscosity of 60 centipoises.

*Example 17.*—After products E, F and I are heated to an elevated temperature of about 90° C. and air blown for a period of about 6 hours while being maintained at said elevated temperature, the resulting respective products, hereinafter designated as EO, FO and IO will all have been converted to a semi-solid state and all will have increased in combined oxygen content by more than 1%. Product EO will be found to have had a high percentage increase in combined oxygen content which is over 19%.

*Example 18.*—After product M is heated to an elevated temperature of 90° C. and air blown for a period of 24 hours while being maintained at said elevated temperature the resulting product, hereinafter designated as MO will have become converted from a liquid to a semi-solid and its combined oxygen content will have been increased by more than 2%.

*Example 19.*—After product K is heated to an elevated temperature of about 90° C. and air blown for a period of about 30 hours while being maintained at said elevated temperature, the resulting product hereinafter designated as KO will have at 25° C. a viscosity of 600 centipoises and will have more than 1% increase in combined oxygen content.

Besides these characteristics of greater combined oxygen content, higher specific gravity and viscosity, these oxidized products, of which products AO, CO, DO, EO, FO, GO, HO, IO, KO and MO are examples have enhanced solubility characteristics for said vinyl resins and are more readily dissolved by solid rubbery polymers of chloroprene butadiene, solid rubbery copolymers of butadiene and styrene and of butadiene and acrylonitrile and by natural and reclaimed rubber, with all of which they act enhanced as plasticizers. These oxidized products, in addition, are useful in the art generally and are useful particularly, for example, (1) for putting vegetable oils into solution with cellulose nitrate, (2) as solvents for materials such as resins of the glycerol-aldehyde resins, vegetable oils, cellulose nitrate, cellulose acetate and ethyl cellulose, (3) flotation of ores, (4) aiding the solvent properties of soaps, and (5) insecticidal sprays when employed either alone or in combination with solids or in a water-soap suspension consisting of about 200 parts of any one of said oxidized products in about 150 parts of water and about 160 parts of sodium oleate. This is then diluted by about 25–50 times its weight with water and used as a spray.

Improved gels are obtained by employing (a) the polymers of vinyl chloride, vinyl acetate, vinyl chloracetate and vinyl acetals, such as vinyl butyral, etc., as well as the copolymers of vinyl chloride and vinyl acetate, especially those polymers and copolymers having a molecular weight of above about 20,000 and in those cases where those having a molecular weight of about 40,000 are available and (b) said oxidized unsaturated organic normally liquid products. Of this class (b), I prefer to employ those in which the terpene and terpene alcohols were the starting materials and more especially those in which turpentine and pine oil were the starting materials.

In preparing the gels with any one of said normally liquid unsaturated organic materials which was then oxidized to increase its viscosity and combined oxygen content, a mixture of said oxidized product and one of said normally solid vinyl resins is heated to elevated temperature and maintained at said temperature until substantially complete solution takes place. Then the solution is allowed to cool to room temperature, 70° F. at which temperature it is a gel. The ratio of the quantity by weight of said vinyl resin to said oxidized product in said mix may vary over wide limits depending upon the type of gel desired. Generally the stiffness or the rigidity of the gel may be controlled by varying this ratio, and the stiffness and rigidity characteristic is directly proportional to this ratio, i. e., the higher this ratio, the stiffer and more rigid the gel. Thus very rigid and stiff solid compositions of matter as well as soft and pliant solid compositions of matter may be produced; solid rubberlike resilient gels may be produced in this manner by employing between about one to twenty-five parts of one of said oxidized products to each part of said vinyl resin. In some cases, and particularly in those cases, where the oxidized product is still a liquid, the same may be subjected to distillation in order to drive off some or all those fractions having boiling points below a predetermined temperature before the oxidized product is mixed with the vinyl resin so that after solution, the resultant gel at room temperature has particular characteristics of dryness, tackiness or wetness desired. For example blown or oxidized "Abalyn," product MO, was heated up to about 240° C. to remove about 10% of its weight and product CO was heated to remove 20% of its weight and in each case they gave a dry gel-like product after solution with "VYNW," solid copolymer of vinyl chloride and vinyl acetate when the ratio of product MO or CO to the solid resin was 5 to 1.

The following are specific examples of specific gels which may be produced as well as the methods which may be employed for the production of these gels, all of the parts being given by weight.

*Example 20.*—About 100 parts of MO are mixed with about 25 parts of solid polymerized vinyl chloride, known to the trade as "Vinylite QYNA," having a molecular weight above 20,000. This mixture is heated in order to raise the temperature thereof to between about 150° C. and 165° C. and is maintained at this temperature and is constantly stirred or agitated to provide a solution thereof. Then the solution is allowed to cool to room temperature 70° F. and at said temperature is a rubbery mass and is a gel.

*Example 21.*—About 2 parts of AO are mixed with about 1 part of solid polyvinyl acetate, known to the trade as "Vinylite AYAT." This mixture is heated to raise the temperature of the mix to between about 290° F. and 320° F. and is maintained at this temperature and is constantly stirred or agitated to provide a solution thereof. Then the solution is allowed to cool to room temperature, 70° F. and at this temperature is a gel and is a rubbery mass.

*Example 22.*—About 3 parts of IO are mixed with about 1 part of a solid copolymer of vinyl acetate and vinyl chloride, such as "VYNF" which is a solid copolymer of eighty-seven parts of vinyl chloride and thirteen parts of vinyl acetate or "VYNS" which is a solid copolymer of ninety parts of vinyl chloride and ten parts of vinyl acetate. This mixture is heated to between about 290° F. and 320° F. and is maintained at this temperature while being constantly stirred to provide a solution thereof. Then the solution is allowed to cool and at room temperature, 70° F., is a gel and a rubbery mass.

*Example 23.*—About 3 parts of FO are mixed with about 1 part of a solid polyvinyl acetal, such as polyvinyl butyral, known on the market as "XYFG," and prepared by treating polyvinyl alcohol with butyric aldehyde. This mixture of FO and polyvinyl butyral is heated to a temperature of between about 290° F. to about 320° F. while being stirred to provide a solution thereof. Then the solution is allowed to cool to room temperature, 70° F., and is a gel and a rubbery mass.

*Example 24.*—About 25 parts of EO are mixed with about 1 part of solid polyvinyl chloride. This mixture is heated to between about 290° F. and 320° F. and maintained at this temperature while being constantly stirred to provide a solution thereof. Then the solution is allowed to cool to room temperature, 70° F., and at said temperature is a rubbery mass and a gel.

*Example 25.*—About 4 parts of KO are mixed with about 1 part of solid polyvinyl chloride. This mixture is heated to between about 290° F. and 320° F. and maintained at this temperature while being constantly agitated to provide a solution thereof. Then the solution is allowed to cool to room temperature, 70° F., and at said temperature is a rubbery mass and a gel.

Novel and improved millable compositions and cured compositions are provided by employing the combination of (a) a rubbery substance selected from the group consisting of solid, rubbery polymers of chlorbutadiene, solid rubbery polymers of butadiene, solid rubbery copolymers of butadiene and styrene, solid rubbery copolymers of butadiene and acrylonitrile, natural rubber and reclaimed rubber and (b) a gel comprising a normally solid vinyl resin selected from the group consisting of the polymers of vinyl chloride, vinyl acetate, vinyl chloracetate and vinyl acetals, such as vinyl butyral, and copolymers of vinyl chloride and vinyl acetate and the oxidized product of a normally liquid unsaturated organic material capable of forming a solution with said gel at elevated temperatures, which solution upon cooling is a gel at 70° F. Other materials may be employed in said combination, and some of them are "Gastex" and "P-33" which are carbon blacks, "Speedon," "Altax" and "Tuads" which are vulcanization agents and accelerators and "Aminox" which is an antioxidant. The relative quantity of said novel gel to the quantity of said rubbery substance in said combination may vary over comparatively wide limits, and is preferably such that the ratio of the quantity of said rubbery substance by weight to quantity by weight of the resin in said gel is between about 50 to 1 and 2 to 1. Millable compositions having improved tear resistance properties may be produced by mixing a quantity of (a) together with a quantity of (b) on a rubber mill. The following general example is illustrative of this phase of the invention.

*Example 26.*—A quantity of a rubbery substance of the aforesaid (a) class was gradually added to a quantity of a gel of the aforesaid (b) class while the latter was being masticated on a differential speed roll mill, the rolls of which were maintained at a temperature approximately about 120° F. Milling is continued until there is an intimate admixture of these substances. Then this intimate mixture may be stripped off the rolls as sheets and cured. If desired, a quantity of a vulcanizing agent, accelerator and reinforcing materials as well as other material used in the compounding of rubber may be added to said mixture and dispersed therethrough on said rubber mill. This product is then sheeted and cured in the usual manner.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect by Letters Patent is:

1. The method comprising heating above about 140° F. a mass of a normally liquid unsaturated organic product capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 50% and the combined oxygen content has increased at least 0.5% and said mass of increased viscosity and combined oxygen content is capable at elevated temperatures of forming a solution with solid polyvinyl chloride which solution on cooling is a gel at 70° F., said normally liquid unsaturated organic product being an organic condensation reaction product of formaldehyde and a liquid selected from the group consisting of terpenes and terpene alcohols in the presence of an acidic condensing agent.

2. The method comprising heating above about 140° F. a mass of a normally liquid unsaturated organic product capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 100% and the combined oxygen content has increased at least 0.5% and said mass of increased viscosity and combined oxygen content is capable at elevated temperatures of forming a solution with solid polyvinyl chloride which solution on cooling is a gel at 70° F., said normally liquid unsaturated organic product being an organic condensation reaction product of formaldehyde and a liquid selected from the group consisting of terpenes and terpene alcohols in the presence of an acidic condensing agent.

3. The method comprising heating between about 140° F. and about 400° F. a mass of a normally liquid unsaturated organic product capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 50%, said normally liquid unsaturated organic product being an organic condensation reaction product of formaldehyde and a liquid selected from the group consisting of terpenes and terpene alcohols in the presence of an acidic condensing agent.

4. The method comprising heating between about 140° F. and about 400° F. a mass of a normally liquid unsaturated organic product capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 100%, said normally liquid unsaturated organic product being an organic condensation reaction product of formaldehyde and a liquid selected from the group consisting of terpenes and terpene alcohols in the presence of an acidic condensing agent.

5. The method comprising heating above 140° F. a mass of a normally liquid organic condensation product produced by reacting a terpene and formaldehyde in the presence of an acidic agent and being capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 50% and the combined oxygen content has increased at least 0.5% and said mass of increased viscosity and combined oxygen content is capable at elevated temperatures of forming a solution with solid polyvinyl chloride which solution on cooling is a gel at 70° F.

6. The method comprising heating above 140° F. a mass of a normally liquid organic condensation product produced by reacting a terpene alcohol and formaldehyde in the presence of an acidic agent and being capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 50% and the combined oxygen content has increased at least 0.5% and said mass of increased viscosity and combined oxygen content is capable at elevated temperatures of forming a solution with solid polyvinyl chloride which solution on cooling is a gel at 70° F.

7. The method comprising heating above 140° F. a mass of a normally liquid organic condensation product produced by reacting turpentine and formaldehyde in the presence of an acidic agent and being capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 50% and the combined oxygen content has increased at least 0.5% and said mass of increased viscosity and combined oxygen content is capable at elevated temperatures of forming a solution with solid polyvinyl chloride which solution on cooling is a gel at 70° F.

8. The method comprising heating above 140° F. a mass of a normally liquid organic condensation product produced by reacting pine oil and formaldehyde in the presence of an acidic agent and being capable at elevated temperatures of forming a solution with solid polyvinyl chloride which solution on cooling is a gel at 70° F. and while said mass is in said heated condition, agitating said mass in the presence of a free oxygen containing gas until the viscosity of said mass at 25° C. has increased at least 50% and the combined oxygen content has increased at least 0.5% and said mass of increased viscosity and combined oxygen content is capable at elevated temperatures of forming a solution with solid polyvinyl chloride which solution on cooling is a gel at 70° F.

9. The product produced according to the method of claim 1.

10. The product produced according to the method of claim 4.

11. The product produced according to the method of claim 5.

12. The product produced according to the method of claim 6.

13. The product produced according to the method of claim 7.

14. The product produced according to the method of claim 8.

MORTIMER T. HARVEY.

REFERENCES CITED

The following references are of record in the file of this patent:

UNITED STATES PATENTS

| Number | Name | Date |
|---|---|---|
| 1,893,982 | Bradley | Jan. 10, 1933 |
| 2,265,161 | Hasselstrom | Dec. 9, 1941 |
| 1,929,453 | Semon | Oct. 10, 1933 |

FOREIGN PATENTS

| Number | Country | Date |
|---|---|---|
| 8,590 | British | of year 1905 |
| 148,944 | German | Feb. 29, 1904 |
| 175,633 | German | Oct. 11, 1906 |

OTHER REFERENCES

Ellis, "Chemistry of Petroleum Derivatives", vol. 1, pp. 925–926 (1934). Copy in Division 6.